United States Patent [19]

Bodier et al.

[11] Patent Number: 4,572,632

[45] Date of Patent: Feb. 25, 1986

[54] COMPOSITE APPARATUS FOR THE DIRECT PROJECTION AND OVERHEAD OR BACKPROJECTION OF SLIDES

[75] Inventors: Jacques Bodier, Claye-Souilly; Pierre Cochard, Cerisiers; Christian Merlier, Livry-Gargan; Edouard P. Bouquin, Domont, all of France

[73] Assignee: Societe Anonyme dite: PRESTINOX, Villepinte, France

[21] Appl. No.: 654,115

[22] Filed: Sep. 25, 1984

[30] Foreign Application Priority Data

Sep. 30, 1983 [FR] France ................................ 83 15588

[51] Int. Cl.⁴ ............................................. G03B 21/30
[52] U.S. Cl. ......................................... 353/71; 353/79
[58] Field of Search ................... 353/77, 79, 72, 71; 352/104

[56] References Cited

U.S. PATENT DOCUMENTS

| | | | |
|---|---|---|---|
| 1,447,403 | 3/1923 | Atherton | 353/72 |
| 2,095,171 | 10/1937 | Cook | 353/79 X |
| 2,299,657 | 10/1942 | Rystedt | 353/72 |
| 2,769,368 | 11/1956 | Bearint | 353/72 |
| 3,834,798 | 9/1974 | Bundschuh | 353/79 X |
| 3,885,868 | 5/1975 | Hadzinihalis | |
| 4,003,644 | 1/1977 | Aruanno | 353/71 X |
| 4,163,610 | 8/1979 | Sanderson | |

FOREIGN PATENT DOCUMENTS

| | | |
|---|---|---|
| 944655 | 5/1956 | Fed. Rep. of Germany . |
| 3029195 | 3/1982 | Fed. Rep. of Germany . |
| 1365421 | 5/1964 | France . |
| 512285 | 1/1955 | Italy ..................................... 353/71 |

Primary Examiner—Harry N. Haroian
Attorney, Agent, or Firm—Sandler & Greenblum

[57] ABSTRACT

A composite apparatus for the direct projection and overhead or back-projection of slides comprises a box containing a source of light with a projection lens, an overhead or back-projection screen and a mirror for reflecting, towards this overhead or back-projection screen, the light beam issuing from the lens.

The means ensuring the displacement of the mirror likewise provoke a displacement to take the mirror outside the box at a distance from the lens which is a function of the focal distance thereof and which is greater than that at which the mirror lies in the case of direct projection. The overhead or back-projection screen is articulated on the upper face of the box, about a horizontal, transverse pin, so as to be able to be opened into a position inclined upwardly and forwardly, to receive the light beam reflected upwardly and rearwardly by the mirror.

7 Claims, 8 Drawing Figures

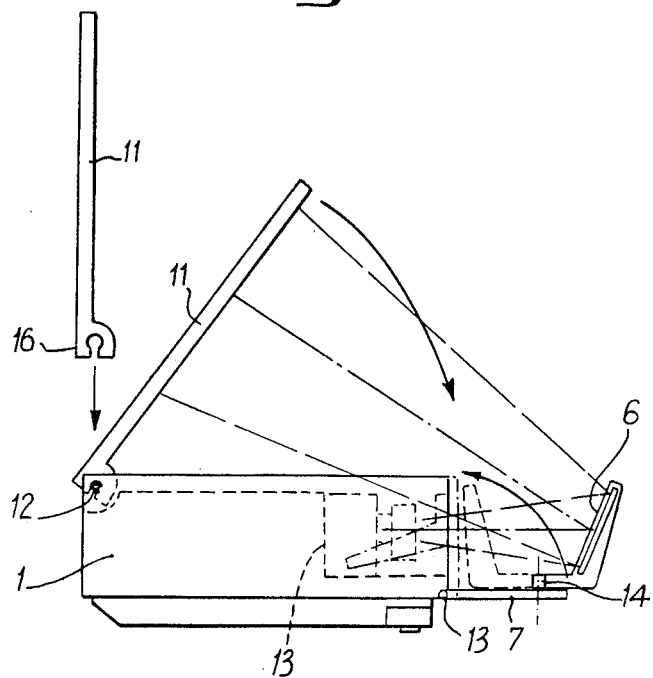
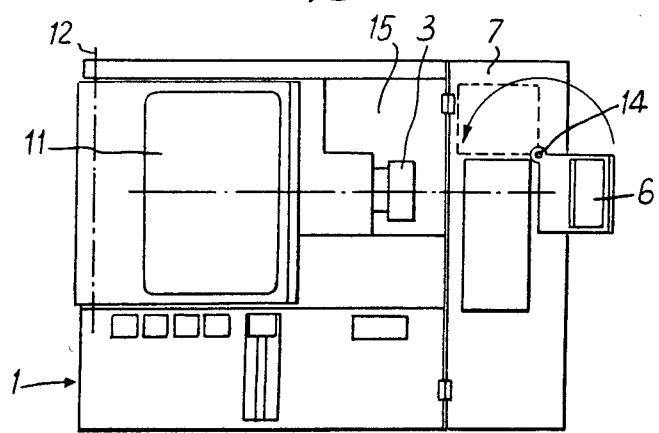

COMPOSITE APPARATUS FOR THE DIRECT PROJECTION AND OVERHEAD OR BACKPROJECTION OF SLIDES

BACKGROUND OF THE INVENTION

The present invention relates to a composite apparatus for the direct projection and overhead or back-projection of slides.

Heretofore known apparatus for the direct projection of slides generally comprise a base on which is mounted the box of the projector, in which box is housed a source of light and which bears a lens. The slides having to be projected are generally contained in magazines in the form of rotating or sliding baskets, each slide to be projected being driven from the basket which contains it by transversely moving push element, to be taken to a position located between the source of light and the lens, and then to be returned into the basket, after projection, by a reverse movement of the transverse push element.

These apparatus for the direct projection of slides which are very wide-spread at the present time, present the drawback of requiring, for the direct projection of slides, the positioning of an independent screen, which must be unwound vertically in front of the lens. The owner of a slide projector must therefore possess an independent screen hence problems of bulk, storage and convenience of use. In fact, the fact of having to bring out an unwindable screen from where it is stored and of having to unwind it is an inconvenient operation, and owners of slide projectors consequently use them rarely in practice.

Certain known apparatus, such as those described in U.S. Pat. Nos. 3,885,868; 4,163,610 and DE Pat. No. 3029195, are equipped with an overhead or back-projection screen made of frosted glass, and with a mobile mirror adapted to occupy two positions, namely a position for direct projection in which the mirror is spaced apart with respect to the lens, aside or above said lens, to allow emergence of the light beam for direct projection, and an overhead of back-projection in which it is interposed immediately in front of the lens.

However, the apparatus according to U.S. Pat. Nos. 3,885,868 and 4,163,610 present the drawback of being cumbersome in height and of having a relatively complex internal structure, with three mirrors for reflecting the light beam. As to the apparatus according to DE Pat. No. 3,029,195, it ensures a projection on a frosted screen of small dimensions provided in a lateral wall of the box, when the mirror is placed in front of the lens, and in that case it merely performs the role of a viewer and not that of an overhead or back-projection apparatus producing an image of large-dimensions which may be oberved by several persons. Finally, all the heretofore known composite apparatus ensure back-projection of the image either on the front face or on a lateral face of the box, so that, if it is desired during projection to pass from observation on a remote large screen to observation on the frosted screen of the projector, the observers must move with respect to the apparatus.

SUMMARY OF THE INVENTION

It is an object of the present invention to overcome these drawbacks by providing a composite apparatus for the direct projection and overhead or back-projection of slides of particularly simple design and in which are incorporated means for easily ensuring overhead or back-projection of the slides, under excellent conditions of reproduction and observation.

To this end this composite apparatus for the direct projection and overhead or back-projection of slides comprising a box containing a source of light with projection lens, an overhead or back-projection screen and a mirror for reflecting, towards this overhead or back-projection screen, the light beam issuing from the lens, this mirror being associated with means for moving it between an overhead or back-projection position in which it is interposed in front of the lens on the path of the light beam, to reflect this beam in the direction of the overhead or back-projection screen, and a position for direct projection in which the mirror lies away from the light beam to allow it to pass towards a remotely located screen, is characterized in that the means ensuring the displacement of the mirror likewise provoke a displacement to take the mirror outside the box at a distance from the lens which is a function of the focal distance fhereof and which is greater than that at which the mirror lies in the case of direct projection, and the overhead or back-projection screen is articulated on the upper face of the box, about a horizontal, transverse pin, so as to be able to be opened into a position inclined upwardly and forwardly, to receive the light beam reflected upwardly and rearwardly by the mirror.

The composite apparatus for the direct projection and overhead or back-projection of slides according to the invention offers the advantage that it may be used as such, without particular adaptation, both for the direct projection of slides and for back-projection thereof, the user, who remains behind the apparatus, not having to move in order to observe the images projected by one or the other of these two modes. In addition, the dimensions of the apparatus are much reduced, its structure with one mobile mirror is particularly simple, yet it allows back-projection of an image of large dimensions.

BRIEF DESCRIPTION OF THE DRAWINGS

The invention will be more readily understood on reading the following description with reference to the accompanying drawings, in which:

FIG. 7 is a side view of another variant of the apparatus in position of overhead or back-projection.

FIG. 8 is a plan view of the apparatus of FIG. 7.

DESCRIPTION OF THE PREFERRED EMBODIMENTS

Figure 1:
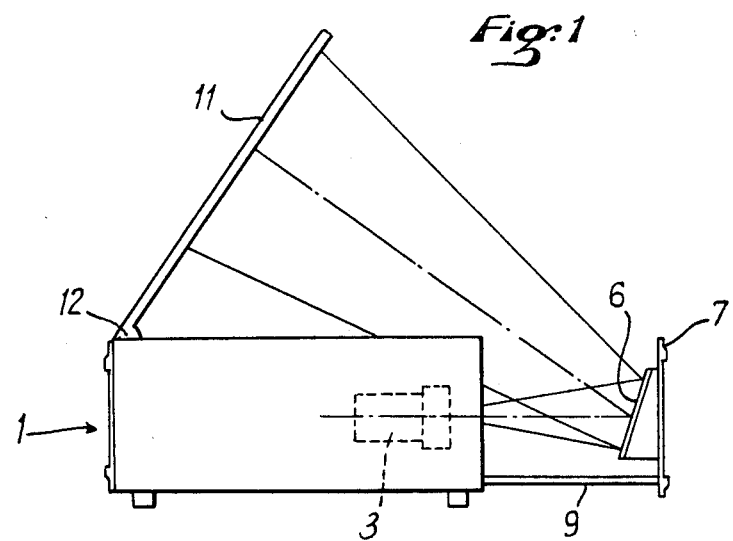
FIG. 1 is a side view of a composite apparatus for the direct projection and overhead or back-projection of slides acording to the invention, in position of overhead or back-projection.
Figure 2:
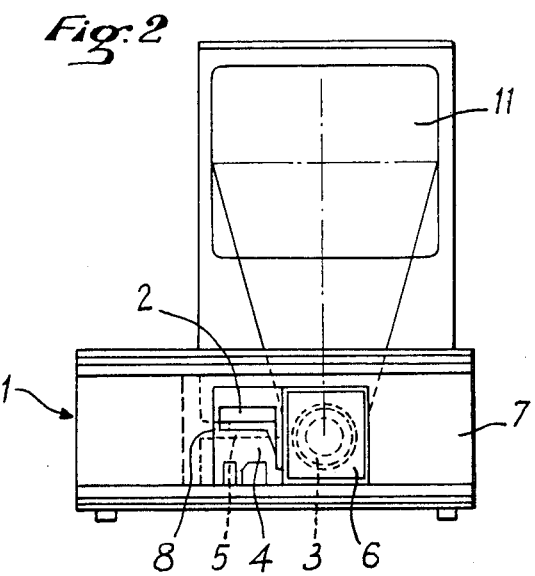
FIG. 2 is a front view of the apparatus in position of overhead or back-projection.
Figure 3:
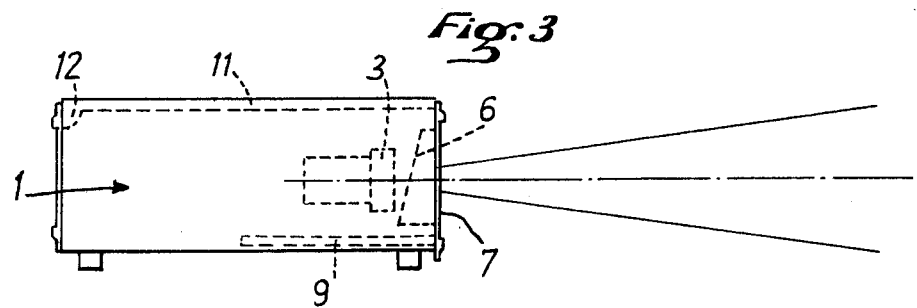
FIG. 3 is a side view of the apparatus in position of direct projection.
Figure 4:
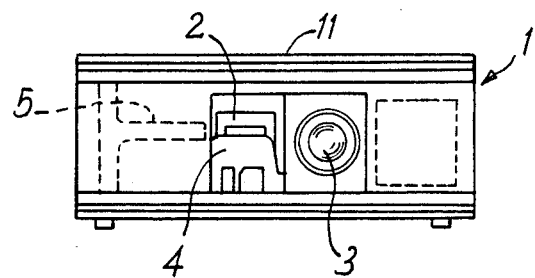
FIG. 4 is a front view of the apparatus in position of direct projection.

Referring now to the drawings, the composite apparatus for the direct projection and overhead or back-projection of slides according to the invention shown in FIGS. 1 to 4 comprises a box 1 of parallelepipedic form, inside which are housed the optical system enabling slides to be projected as well as all the conventional electrical and electronic components. This optical system conventionally comprises a light source (not shown) and a lens 3, aligned longitudinally. The slides 2 are preferably stored one after the other in a magazine 4 constituted by a basket sliding longitudinally. Each slide 2 may be taken into position of projection, in which it lies between the light source and the lens 3, by a push element 5 animated by a transverse movement and controller manually or automatically.

The apparatus according to the invention is provided with means for ensuring, in addition to the direct projection of the slides, an overhead or back-projection thereof. These means comprise a mirror 6 which normally lies away from the light beam issuing from the lens 3 and which may be interposed on the path of this light beam when it is desired to make a back-projection.

In the non-limiting embodiment shown in FIGS. 1 to 4, the mirror 6 is mounted to slide transversely, i.e. perpendicularly to the optical axis, on the inner face of the front vertical wall 7 of the box 1. This wall 7 presents, in its central part, a rectangular window 8 which extends in front of the lens 3 and the basket 4. Consequently, when the apparatus is used in direct projection, the light beam issuing from the lens 3 may emerge freely through the window 8 to strike a screen placed at a distance therefrom and, furthermore, the window 8 also allows the basket 4 constituting the magazine of the slides 2 to emerge progressively as said slides are projected. In position of direct projection (FIGS. 3 and 4), the mirror 6 is offset laterally, on the inner face of the wall 7, so as to allow free passage for the light beam issuing from the lens 3, through window 8. On the contrary, when it is desired to make an overhead or back-projection of a slide, the mirror 6 is brought in front of the lens 3 and in the axis thereof at a greater distance, depending on the focal distance of this lens, than in the case of direct projection. To this end, the front wall 7 of the box 1 is mounted to slide longitudinally, i.e. parallel to the optical axis of the lens 3. The vertical front wall 7 is fast with a horizontal support 9 sliding in an appropriate slide provided in the lower part of the box 1. Consequently, once the front wall 7 has been pulled forwards, into position of overhead or back-projection, as shown in FIG. 1, it suffices to slide the mirror 6 transversely, on the inner face of the front wall 7, to bring it into the axis of the lens 3.

Furthermore, the box 1 bears on its upper face a frosted overhead or back-projection screen 11 which is articulated on the upper horizontal face of the box 1, about a horizontal, transverse pin 12 located at the rear of the apparatus. To allow overhead or back-projection of a slide, the screen 11 is pivoted from its horizontal retracted position (FIGS. 3 and 4), in which it is applied on or built in the upper horizontal face of the box 1, anti-clockwise about axis 12, to bring it into the upwardly and forwardly inclined position shown in FIGS. 1 and 2. Consequently, the light beam issuing from the lens 3 is reflected by the mirror 6 upwardly and rearwardly, toward the frosted screen 11 so that the user always standing behind the apparatus can see before him the image of great dimension on this screen 11, this image being direct and therefore not requiring the slides to be reversed in their basket.

In overhead or back-projection, the mirror 6 is displaced forwardly sufficiently for the light beam reflected upwardly and rearwardly not to be intercepted by the front face of the box 1. To this end, the front face may possibly be recessed, in its central upper part, to allow free passage for the lower part of the reflected light beam.

Passage from the position of overhead or back-projection to the position of direct projection is very easy to effect since it suffices to slide the mirror 6 horizontally and transversely on the inner face of the vertical wall 7 to bring it into lateral offset position, then to return the support 9 inside the box 1 so that the front wall 7 is close to the lens 3, and to fold down the frosted screen 11 on the upper horizontal face of the box 1.

Figure 5:
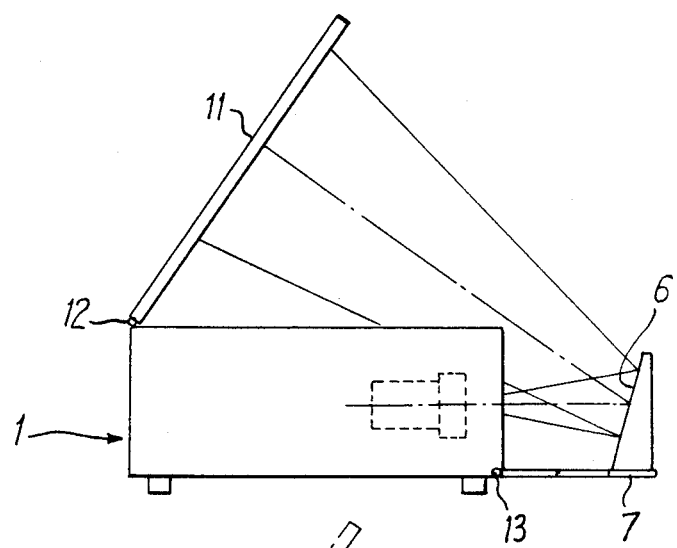
FIG. 5 is a side view of a variant of the apparatus in position of overhead or back-projection.
Figure 6:
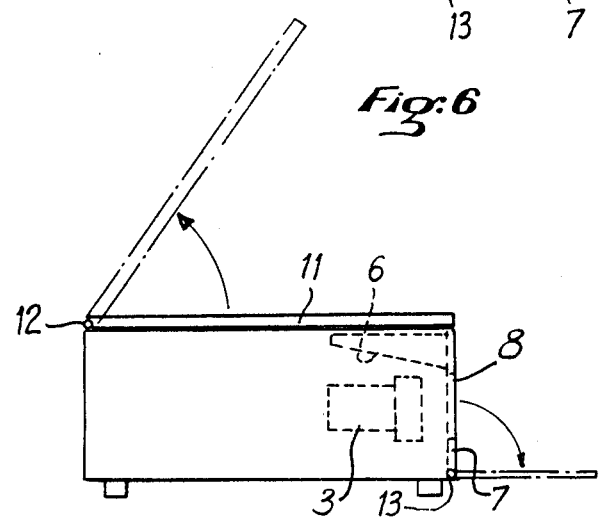
FIG. 6 is a side view of the apparatus of FIG. 5 in position of direct projection.

FIGS. 5 and 6 illustrate a variant embodiment of the apparatus in which the front vertical wall 7 of the box 1 is not sliding, but mounted to pivot on its lower part, about a horizontal, transverse pin 13. Furthermore, the mirror 6 is fast with the upper part, located above the window 8, of the front wall 7 and it extends inside the box, above the lens 3, being inclined on the horizontal upwardly and rearwardly when the apparatus is in position of direct projection, as shown in FIG. 6. In this position, the frosted screen 11 is folded down above the mirror 6. To pass into position of overhead or back-projection, it suffices to pivot the frosted screen 11 anti-clockwise about the horizontal, transverse pin 12, as in the embodiment described hereinabove, to take it into upwardly and forwardly inclined position (FIG. 5) above the box 1, and then to pivot the front wall 7 about the pin 13, clockwise, to take it to the horizontal, as shown in FIG. 5. In this position, the mirror 6 is placed at a distance in front of the lens 3, being inclined by the appropriate angle for reflecting the light beam towards the frosted screen 11, the distance of the mirror 6 with respect to the lens 3 depending on the focal distance of the latter and being sufficient for the reflected light beam not to be intercepted by the front face of the box 1.

In the variant embodiment illustrated in FIGS. 7 and 8, the mirror 6 is mounted to pivot on the inner face of the vertical wall 7, about a pin 14 perpendicular to this vertical wall 7. In FIG. 7, the mirror 6 is shown in solid lines in the position in which it is interposed in front of the lens 3, the vertical wall 7 being folded down horizontally in front of the apparatus; in broken lines in the position in which it lies on this wall 7 then horizontal before pivoting through 180°; and in chain-dotted lines when the wall 7 is vertical and the mirror 6 is then placed in a housing 15 inside the box of the apparatus.

The apparatus shown in FIGS. 7 and 8 also comprises a frosted screen 11 which is removable to facilitate accessibility in the projection function. To this end, the screen 11 presents, at its end articulated about the horizontal, transverse pin 12, a fork-shaped portion 16 clipping on the pin 12 to allow the frosted screen 11 to pivot and to be easily removed.

When the projector is in position of overhead or back-projection, as illustrated in FIGS. 7 and 8, it suffices, to pass it into position of direct projection, to pivot the mirror 6 through 180° about pin 14, then to raise the wall 7 into vertical position, the mirror then being placed in its housing 15, and finally to lower the frosted screen 11 into horizontal position or to remove it in the event of a rotating basket being used.

What I claim is:

1. Composite apparatus for direct projection and overhead projection of slides comprising:
    (a) a box which defines a particular boundary when in a closed position and includes a source of light and a projection lens having a particular focal distance;

(b) an overhead screen hingedly mounted on an upper face of said box, about a first horizontal, transverse pin;

(c) a mirror for reflecting a light beam issuing from said lens toward said overhead screen;

(d) means for moving said mirror between a first direct viewing position inside said boundary and out of a path of said light beam issuing from said lens to allow said light beam to pass towards a remotely located screen, and a second overhead viewing position outside said boundary wherein said mirror is interposed in front of said lens in the path of said light beam to reflect said beam towards said overhead screen, and longitudinally displaced from said box at a distance from said lens which is a function of said focal distance of said lens; and wherein said overhead screen being adapted to have a first position wherein said screen lies flat and substantially parallel to a top surface of said box, and a second position outside said boundary wherein said overhead screen is opened in a position inclined upwardly and forwardly to receive said light beam reflected upwardly and rearwardly by said mirror.

2. The composite apparatus according to claim 1 wherein said box further comprises a magazine for holding slides and a front vertical wall having a window substantially in a center part of said front vertical wall and extending in front of said lens and said magazine, and wherein said front wall is slideably mounted along a longitudinal axis parallel to an optical axis of said lens, and said mirror being slideably mounted on an inner face of said front vertical wall along a transverse axis which is perpendicular to said longitudinal axis; and wherein when said mirror is in said first direct viewing position inside said boundary, said mirror is offset laterally from said window along said front vertical wall so as to allow free passage for said light beam issuing from said lens through said window and when said mirror is in said second overhead viewing position outside said boundary, said mirror is offset longitudinally said distance from said lens and parallel to said optical axis of said lens.

3. The composite apparatus according to claim 2, wherein said box further comprises a lower portion having a slide, said slide having a horizontal support slideably mounted therein, and said horizontal support being connected to said front vertical wall.

4. The composite apparatus according to claim 1 wherein said box further comprises a magazine for holding slides and a front vertical wall having a window substantially in a center part of said front vertical wall extending in front of said lens and said magazine and wherein said front vertical wall has a lower part and an upper part, said upper part located above said window, said front vertical wall is pivotably mounted about a second horizontal transverse pin, and said mirror is connected to said upper part of said front vertical wall; and wherein when said mirror is in said first direct viewing position inside said boundary, said mirror extends inside said box above said lens and is positioned on an incline upwardly and rearwardly and when said mirror is in said second overhead viewing position outside said boundary, said mirror is offset longitudinally said distance from said lens and parallel to said optical axis of said lens.

5. The composite apparatus according to claim 1 wherein said box further comprises a magazine for holding slides, a front vertical wall having a window substantially in a center part of said front vertical wall and extending in front of said lens and said magazine, and a housing for receiving said mirror when said front vertical wall is placed in a vertical position and wherein said front vertical wall has a lower part and an upper part, said upper part located above said window, said front vertical wall is pivotally mounted about a second horizontal transverse pin; and said mirror is connected to said front vertical wall about a third pin, said third pin being perpendicular to said front vertical wall.

6. The composite apparatus according to claim 1 wherein said overhead screen is removably mounted on said first horizontal, transverse pin.

7. Composite apparatus for direct projection and overhead projection of slides comprising:

(a) a box which defines a particular boundary when in a closed position and comprises a source of light, a projection lens having a particular focal distance, a magazine for holding slides and a front vertical wall having a window substantially in a center part of said front vertical wall and extending in front of said lens and said magazine;

(b) an overhead screen hingedly mounted on an upper face of said box, about a first horizontal, transverse pin;

(c) a mirror for reflecting a light beam issuing from said lens towards said overhead screen;

(d) means for moving said mirror between a first direct viewing position inside said boundary and out of a path of said light beam issuing from said lens to allow said light beam to pass towards a remotely located screen, and a second overhead viewing position outside said boundary wherein said mirror is interposed in front of said lens in the path of said light beam to reflect said beam towards said overhead screen, and longitudinally displaced from said box at a distance from said lens which is a function of said focal distance of said lens; and wherein said front wall is slideably mounted along a longitudinal axis parallel to an optical axis of said lens, said mirror is slideably mounted on an inner face of said front vertical wall along a transverse axis which is perpendicular to said longitudinal axis, and said overhead screen is adapted to have a first position wherein said screen lies flat and substantially parallel to a top surface of said box, and a second position outside said boundary wherein said overhead screen is opened in a position inclined upwardly and forwardly to receive said light beam reflected upwardly and rearwardly by said mirror; and wherein when said mirror is in said first direct viewing position inside said boundary, said mirror is offset laterally from said window along said front vertical wall so as to allow free passage for said light beam issuing from said lens through said window and when said mirror is in said second overhead viewing position outside said boundary, said mirror is offset longitudinally said distance from said lens and parallel to said optical axis of said lens.

* * * * *